United States Patent
Ohashi

(10) Patent No.: US 12,487,343 B2
(45) Date of Patent: Dec. 2, 2025

(54) DISTANCE MEASUREMENT DEVICE, METHOD OF CONTROLLING DISTANCE MEASUREMENT DEVICE, AND ELECTRONIC APPARATUS

(71) Applicant: SONY SEMICONDUCTOR SOLUTIONS CORPORATION, Kanagawa (JP)

(72) Inventor: Kazuki Ohashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 923 days.

(21) Appl. No.: 17/753,863

(22) PCT Filed: Jul. 18, 2020

(86) PCT No.: PCT/JP2020/027979
§ 371 (c)(1),
(2) Date: Mar. 16, 2022

(87) PCT Pub. No.: WO2021/059698
PCT Pub. Date: Apr. 1, 2021

(65) Prior Publication Data
US 2022/0342053 A1 Oct. 27, 2022

(30) Foreign Application Priority Data
Sep. 25, 2019 (JP) ................ 2019-173695

(51) Int. Cl.
*H04N 23/73* (2023.01)
*G01S 7/486* (2020.01)
*G01S 17/894* (2020.01)

(52) U.S. Cl.
CPC .......... *G01S 7/4868* (2013.01); *G01S 17/894* (2020.01); *H04N 23/73* (2023.01)

(58) Field of Classification Search
CPC ..... G01S 7/4868; G01S 17/894; H04N 23/73; H04N 23/673; H04N 23/671; H04N 23/74; G01C 3/06; G02B 7/40
(Continued)

(56) References Cited

U.S. PATENT DOCUMENTS

| | | | |
|---|---|---|---|
| 2012/0106803 A1* | 5/2012 | Lee | G01S 17/50 |
| | | | 382/107 |
| 2013/0070116 A1* | 3/2013 | Suzuki | H04N 23/611 |
| | | | 348/222.1 |

(Continued)

FOREIGN PATENT DOCUMENTS

| | | |
|---|---|---|
| CN | 110446943 A | 11/2019 |
| EP | 3605141 A1 | 2/2020 |

(Continued)

OTHER PUBLICATIONS

International Search Report and Written Opinion of PCT Application No. PCT/JP2020/027979, issued on Oct. 13, 2020, 11 pages of ISRWO.

*Primary Examiner* — Stephen P Coleman
(74) *Attorney, Agent, or Firm* — CHIP LAW GROUP

(57) ABSTRACT

A distance measurement device includes a light detection unit, an exposure control unit; a distance image calculator, a detector, and a control unit. The light detection unit receives light from a subject. The exposure control unit performs exposure control on the basis of a signal value outputted by the light detection unit. The distance image calculator calculates a distance image on the basis of an output of the light detection unit. The distance image includes depth and a confidence value. The detector detects, from a feature of data processed by the distance image calculator, a close and low-reflectance object whose distance is unmeasurable. The control unit dynamically controls at least one of a parameter of the exposure control unit or a (Continued)

parameter of the distance image calculator on the basis of a result of detection of the detector.

14 Claims, 11 Drawing Sheets

(58) Field of Classification Search
USPC .......................................................... 382/106
See application file for complete search history.

(56) References Cited

U.S. PATENT DOCUMENTS

2019/0212125 A1    7/2019   Deleule et al.
2020/0025932 A1*   1/2020   Saitou ................... G01S 7/4868

FOREIGN PATENT DOCUMENTS

| | | |
|---|---|---|
| JP | 2012-168049 A | 9/2012 |
| JP | 2014-089114 A | 5/2014 |
| JP | 2016-035398 A | 3/2016 |
| JP | 2018-105638 A | 7/2018 |
| JP | 2018-136123 A | 8/2018 |
| WO | 2014/069097 A1 | 5/2014 |
| WO | 2016/208215 A1 | 12/2016 |
| WO | 2018/180391 A1 | 10/2018 |

* cited by examiner

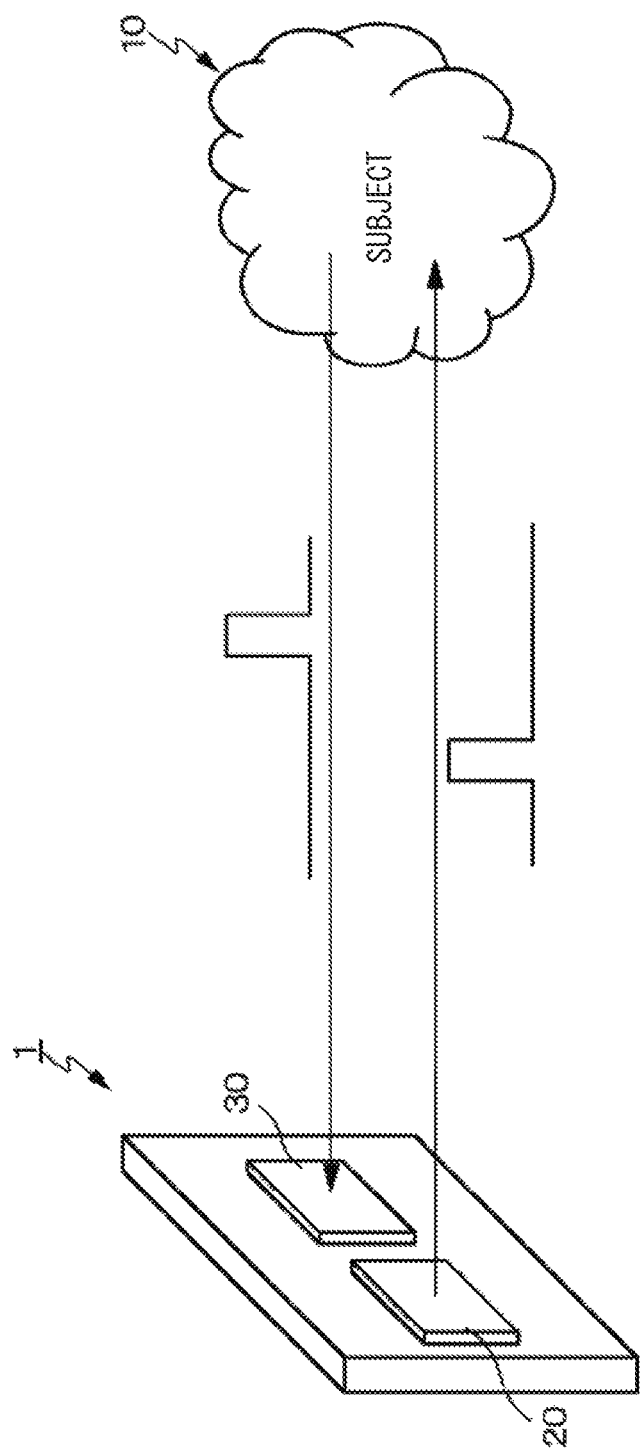
[FIG. 1]

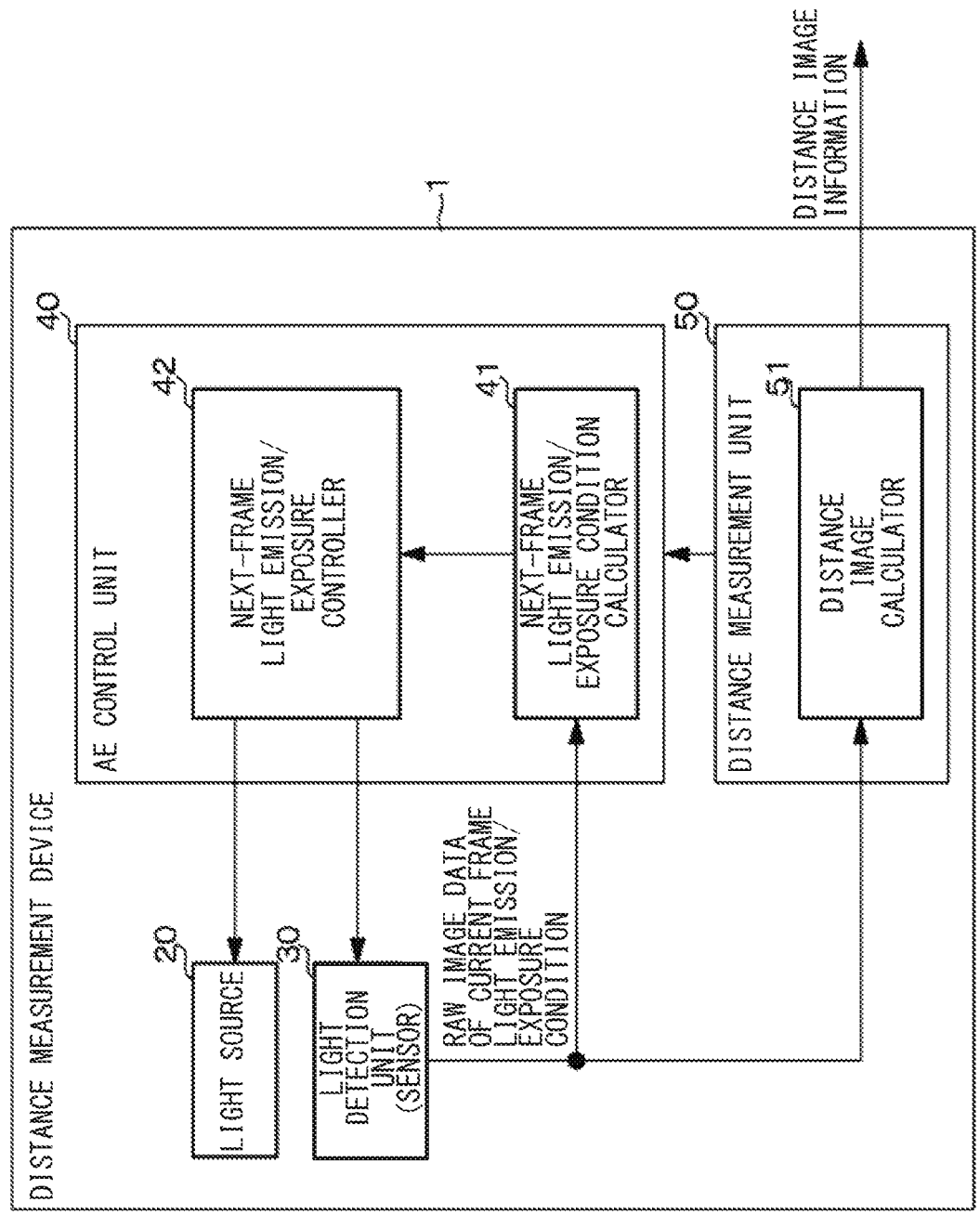
[FIG. 2]

[FIG. 3]
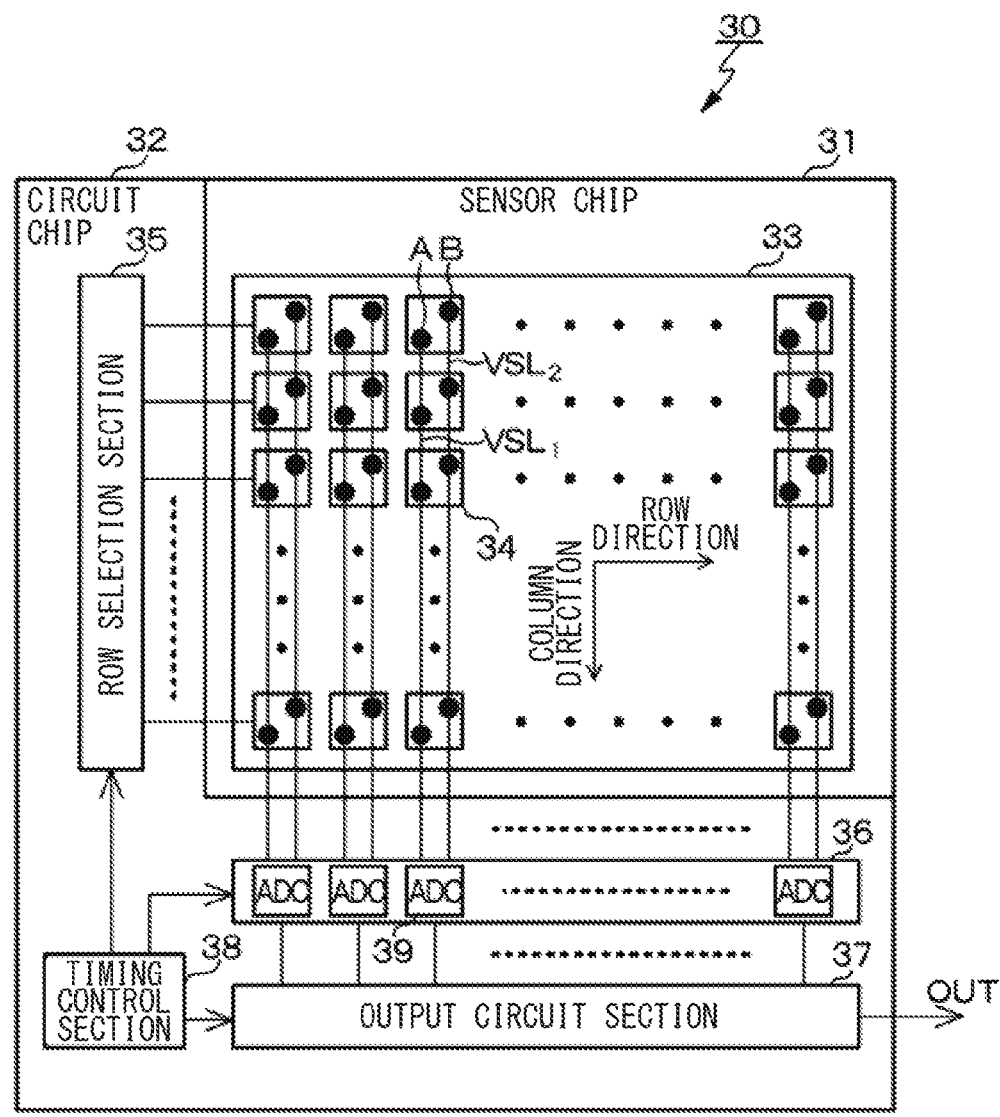

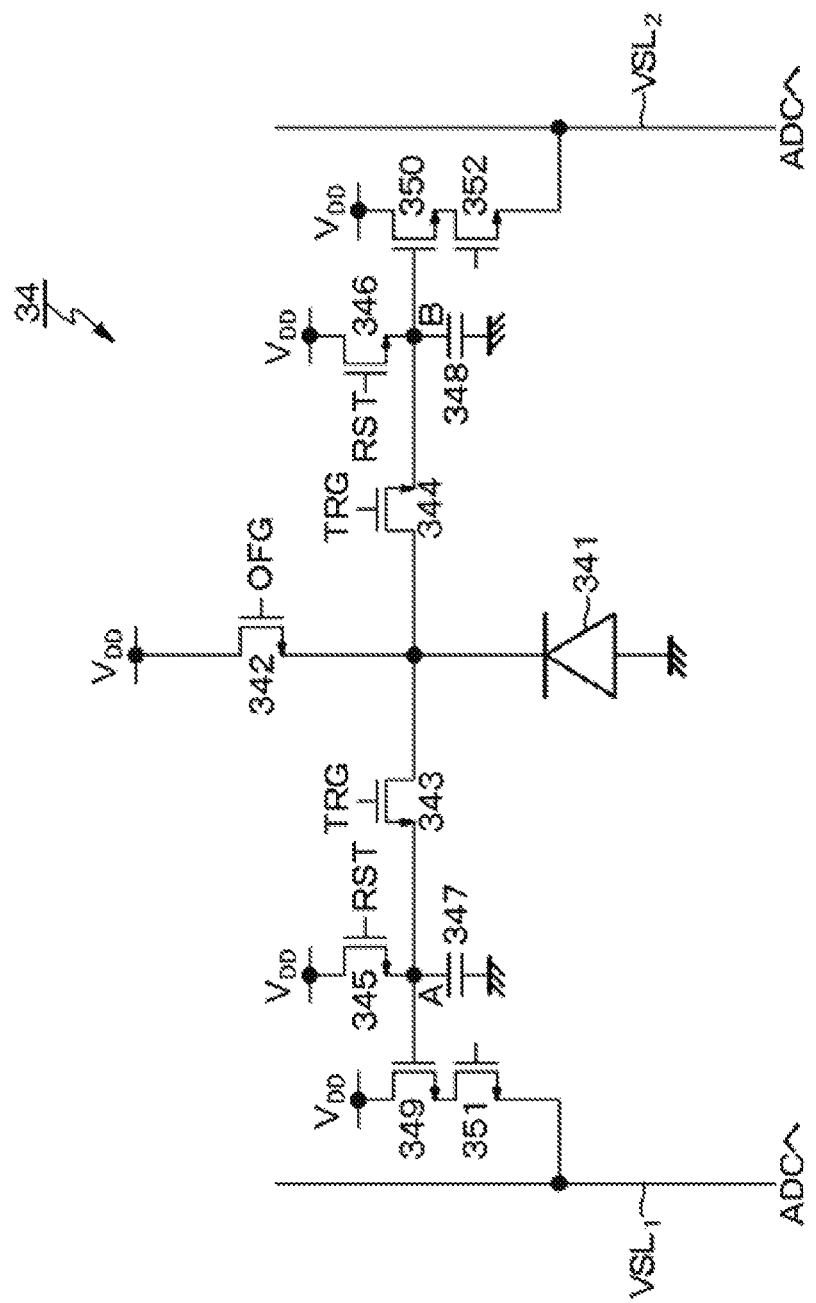
[FIG. 4]

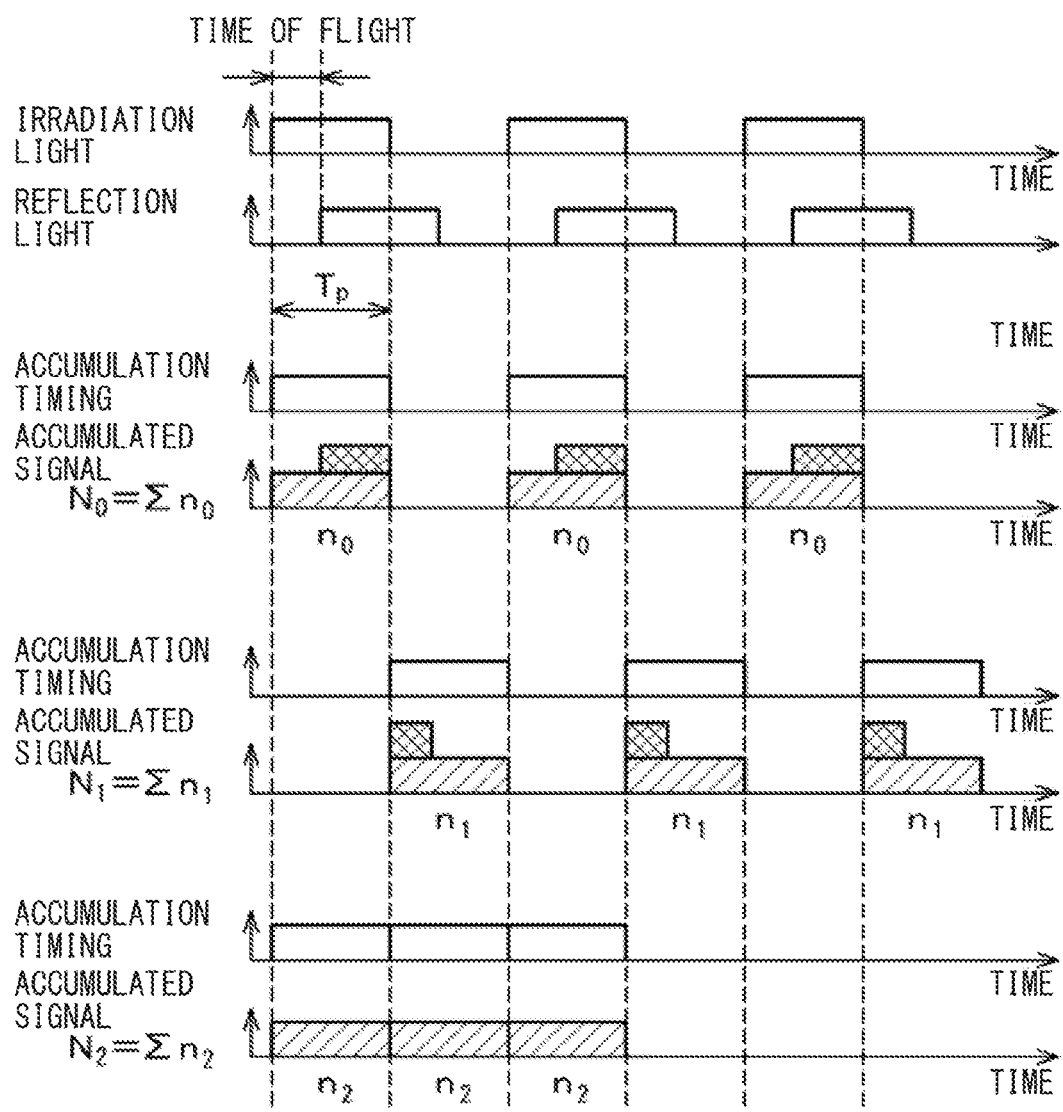
[FIG. 5]

[FIG. 6]
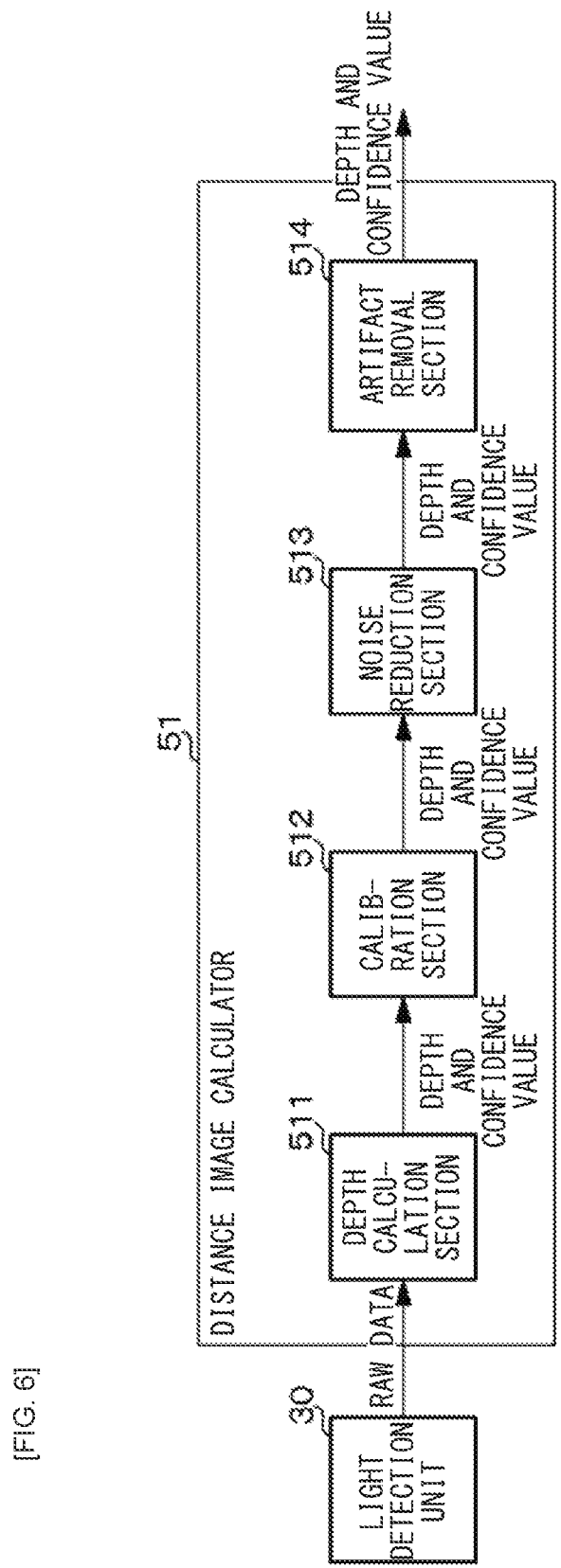

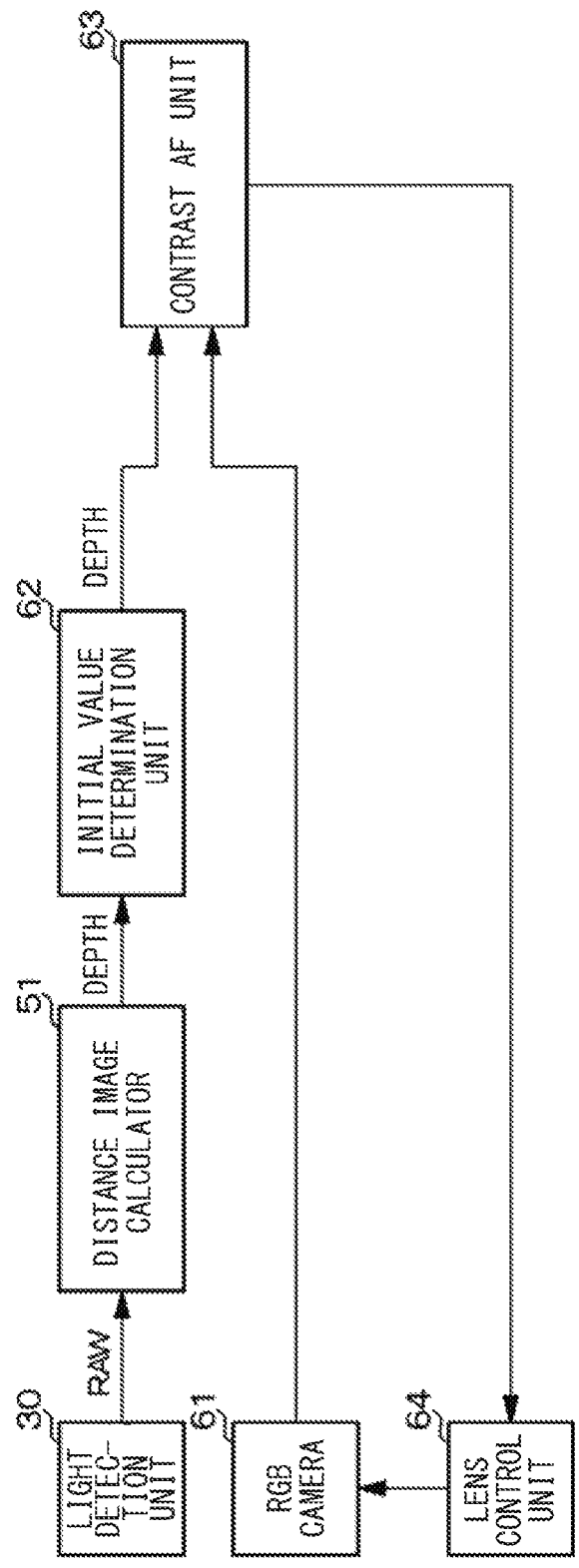

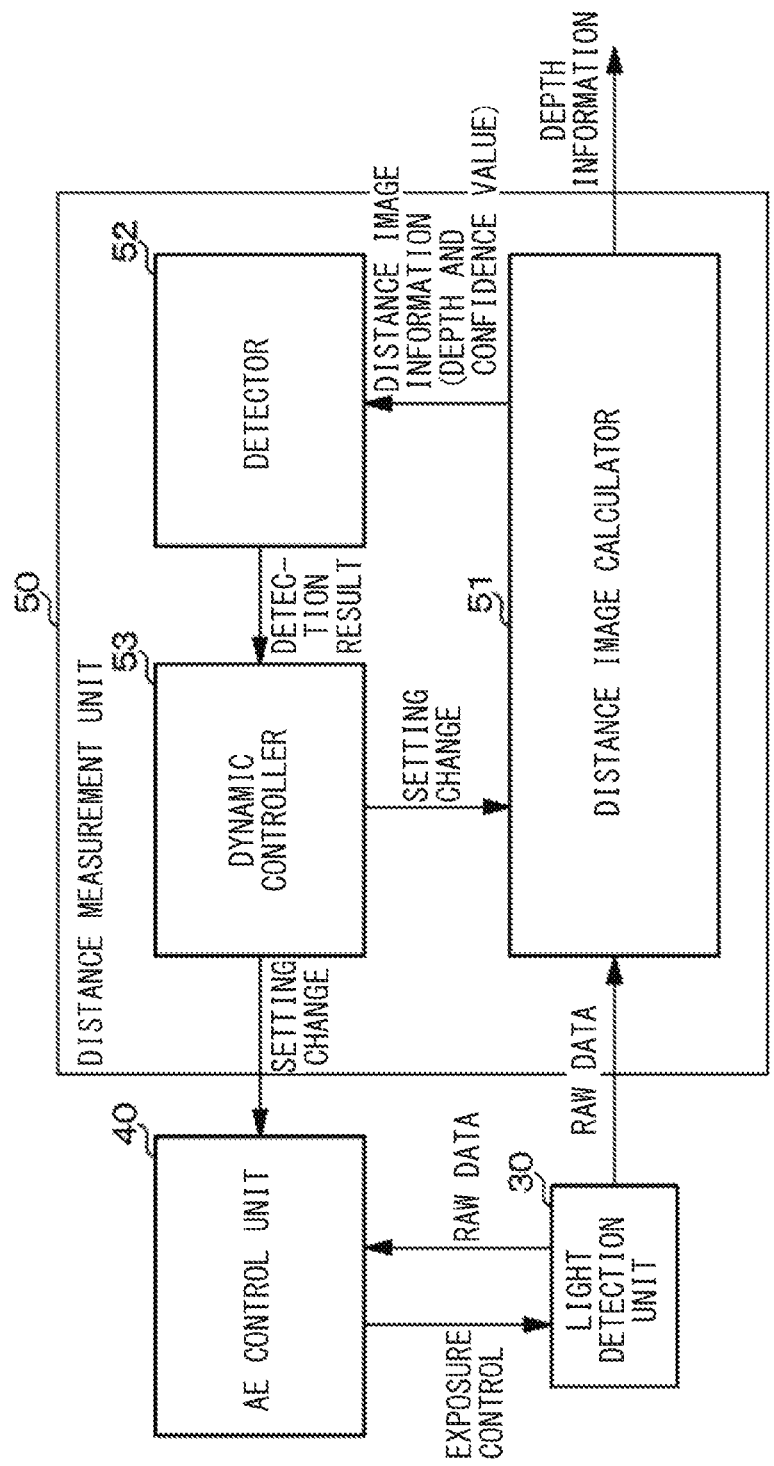
[FIG. 8]

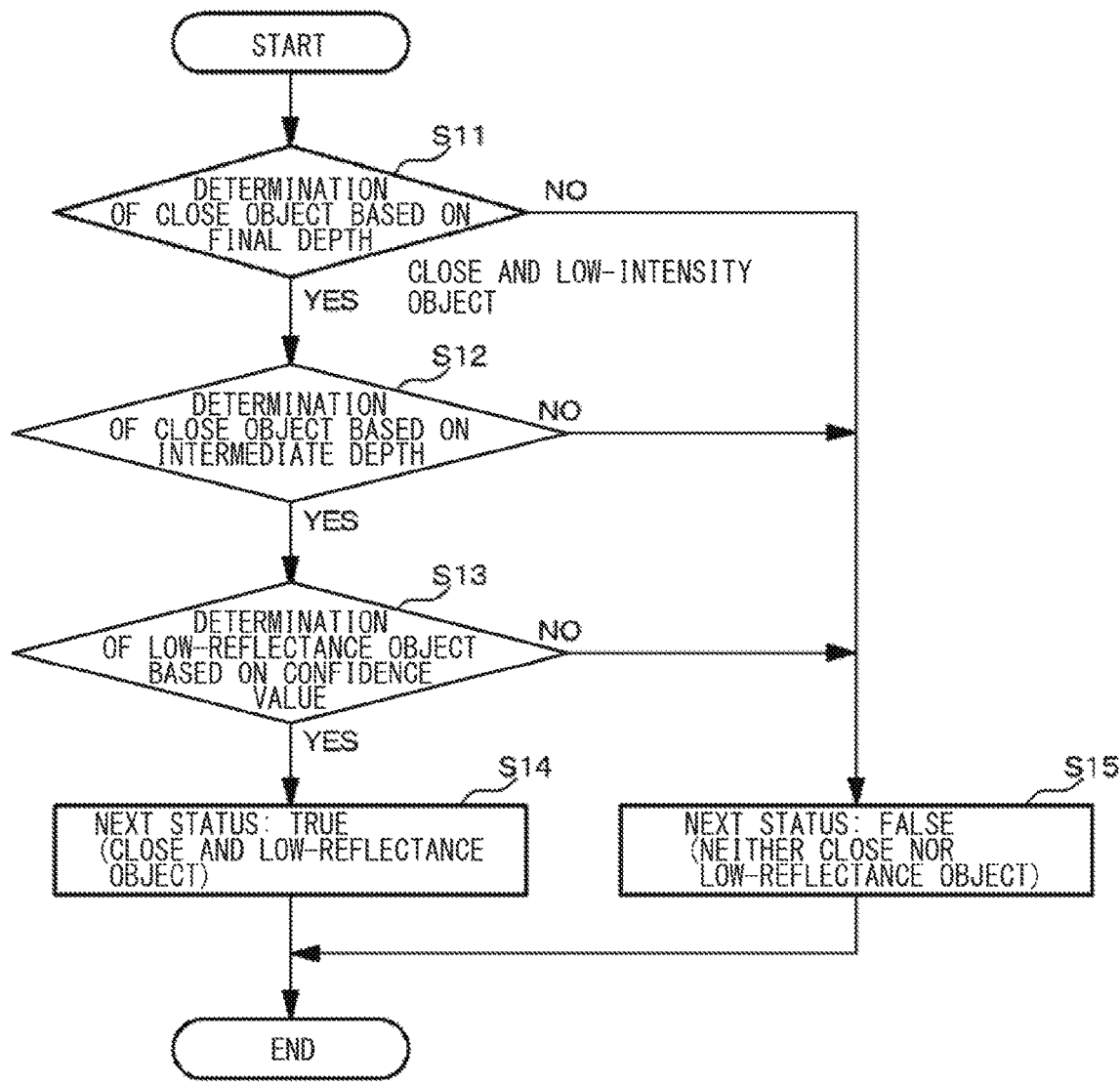
[FIG. 9]

[FIG. 10A]
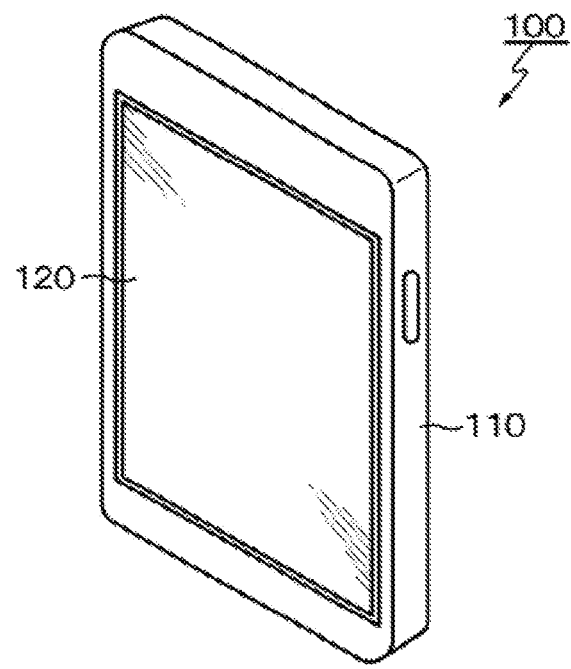
[FIG. 10B]
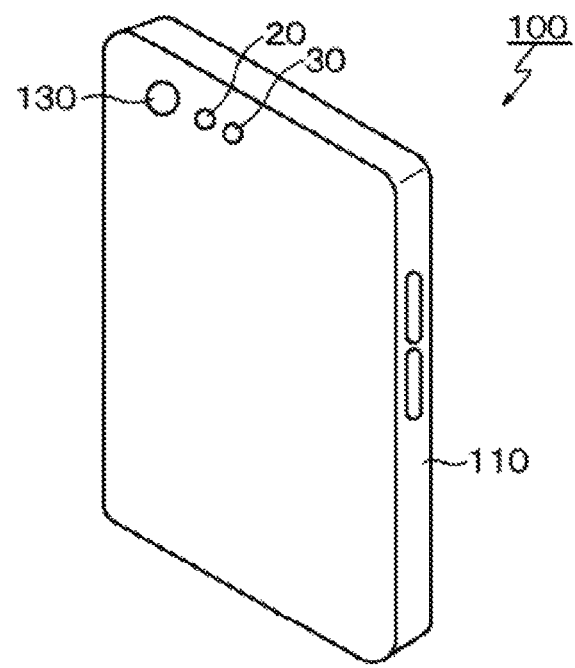

[FIG. 11A]
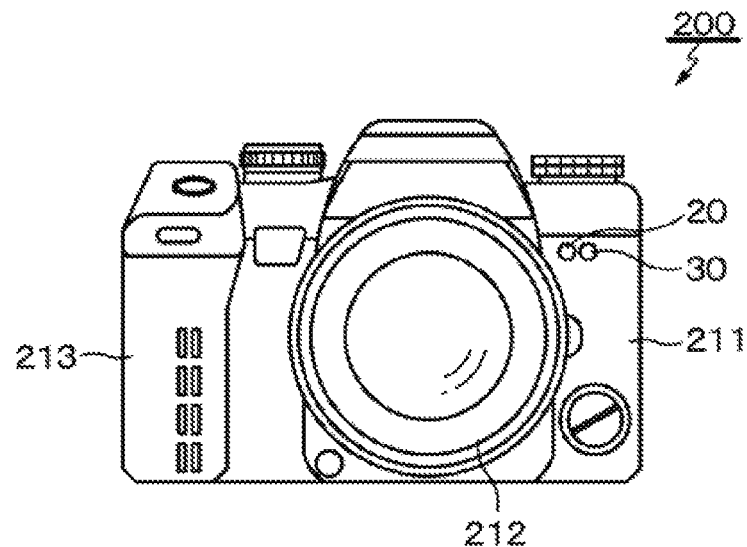
[FIG. 11B]
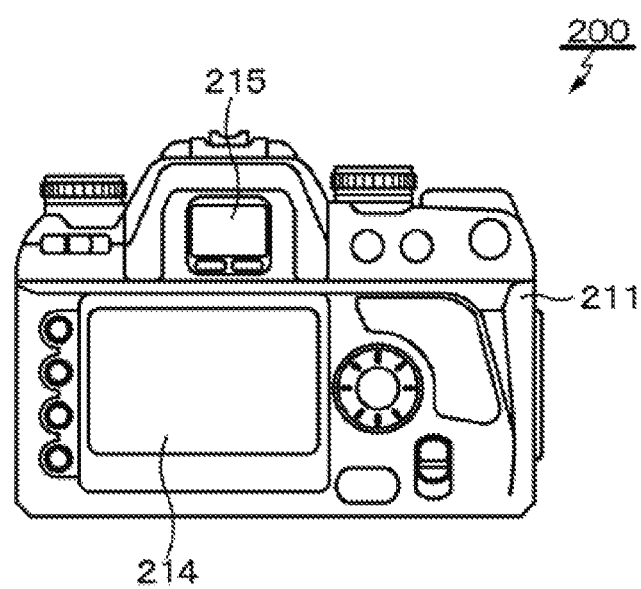

DISTANCE MEASUREMENT DEVICE, METHOD OF CONTROLLING DISTANCE MEASUREMENT DEVICE, AND ELECTRONIC APPARATUS

CROSS REFERENCE TO RELATED APPLICATIONS

This application is a U.S. National Phase of International Patent Application No. PCT/JP2020/027979 filed on Jul. 18, 2020, which claims priority benefit of Japanese Patent Application No. JP 2019-173695 filed in the Japan Patent Office on Sep. 25, 2019. Each of the above-referenced applications is hereby incorporated herein by reference in its entirety.

TECHNICAL FIELD

The present disclosure relates to a distance measurement device, a method of controlling a distance measurement device, and an electronic apparatus.

BACKGROUND ART

Distance measurement devices (distance measuring devices) each of which acquires distance information (distance image information) regarding the distance to a subject include devices (sensors) each of which uses a ToF (Time of Flight: time of flight) method. The ToF method is a method of measuring the distance to a subject (measurement target) by radiating light toward the subject from a light source and detecting the time of flight elapsed before the irradiation light is reflected and returned to the light detection unit by the subject.

One of ToF methods is an indirect (indirect) ToF method of measuring the distance to a subject by detecting a cycle in which pulse light having a predetermined cycle that is emitted from a light source is reflected by the subject and the reflection light is received by a light detection unit and measuring the time of flight from the phase difference between the light emission cycle and the light reception cycle (e.g., see PTL 1).

CITATION LIST

Patent Literature

PTL 1: Japanese Unexamined Patent Application Publication No. 2016-035398

SUMMARY OF THE INVENTION

Problems to be Solved by the Invention

An indirect ToF distance measurement device is applicable, for example, to autofocus that automatically adjusts the focus (focus) of the camera. In a case where an image of a low-reflectance object is obliquely shot in autofocus application, the object gets out of focus. Especially, in a case of defocus at a short distance, a user who shoots an image feels quite strange.

Accordingly, an object of the present disclosure is to provide a distance measurement device that is able to perform exposure control to bring even a close and low-reflectance object into focus, a method of controlling a distance measurement device, and an electronic apparatus including the distance measurement device.

Means for Solving the Problems

A distance measurement device according to the present disclosure for achieving the object described above includes: a light detection unit; an exposure control unit; a distance image calculator; a detector; and a control unit. The light detection unit receives light from a subject. The exposure control unit performs exposure control on the basis of a signal value outputted by the light detection unit. The distance image calculator calculates a distance image on the basis of an output of the light detection unit. The distance image includes depth and a confidence value. The depth includes deepness information of the subject. The confidence value includes light reception information of the light detection unit. The detector detects, from a feature of data processed by the distance image calculator, a close and low-reflectance object whose distance is unmeasurable. The control unit dynamically controls at least one of a parameter of the exposure control unit or a parameter of the distance image calculator on the basis of a result of detection of the detector.

A method of controlling a distance measurement device according to the present disclosure for achieving the object described above includes dynamically controlling, in the distance measurement device including a light detection unit, an exposure control unit, a distance image calculator, and a detector, at least one of a parameter of the exposure control unit or a parameter of the distance image calculator on the basis of a result of detection of the detector. The light detection unit receives light from a subject. The exposure control unit performs exposure control on the basis of a signal value outputted by the light detection unit. The distance image calculator calculates a distance image on the basis of an output of the light detection unit. The distance image includes depth and a confidence value. The depth includes deepness information of the subject. The confidence value includes light reception information of the light detection unit. The detector detects, from a feature of data processed by the distance image calculator, a close and low-reflectance object whose distance is unmeasurable.

In addition, an electronic apparatus according to the present disclosure to achieve the object described above includes a distance measurement device having the configuration described above.

BRIEF DESCRIPTION OF DRAWING

FIG. 1 is a conceptual diagram of a ToF distance measurement system.

FIG. 2 is a block diagram illustrating an example of a configuration of a ToF distance measurement device to which technology according to the present disclosure is applied.

FIG. 3 is a block diagram illustrating an example of a configuration of a light detection unit in the distance measurement device.

FIG. 4 is a circuit diagram illustrating an example of a circuit configuration of a pixel in the light detection unit.

FIG. 5 is a timing waveform chart for describing calculation of distance by the ToF distance measurement device.

FIG. 6 is a block diagram illustrating an example of a configuration of a distance image calculator of the distance measurement unit in the distance measurement device.

FIG. 7 is a block diagram illustrating an overview of a configuration of an autofocus system.

FIG. 8 is a block diagram illustrating an example of a configuration of a distance measurement unit according to a working example 1.

FIG. 9 is a flowchart illustrating an example of a detection process of a detector according to a working example 2.

FIG. 10A is an external view of a smartphone according to a specific example 1 of an electronic apparatus according to the present disclosure from a front side and FIG. 10B is an external view from a back side.

FIG. 11A is an external view of a digital still camera according to a specific example 2 of the electronic apparatus according to the present disclosure from a front side and FIG. 11B is an external view from a back side.

MODES FOR CARRYING OUT THE INVENTION

The following describes modes for carrying out the technology according to the present disclosure (referred to as "embodiments" below) in detail with reference to the drawings. The technology according to the present disclosure is not limited to the embodiments, but a variety of numerical values and the like in the embodiments are examples. In the following description, the same elements or elements having the same functions are denoted by the same signs and redundant description is omitted. It is to be noted that the description is given in the following order.

1. General Description of Distance Measurement Device and Electronic Apparatus according to the Present Disclosure
2. ToF Distance Measurement System
3. Distance Measurement Device to which Technology according to the Present Disclosure Is Applied
3-1. System Configuration
3-2. Configuration Example of Light Detection Unit
3-3. Circuit Configuration Example of Pixel
3-4. Autofocus System
3-5. Regarding Low-reflectance and Close Object
4. Embodiment of the Present Disclosure
4-1. Working Example 1 (Configuration Example of Distance Measurement Unit)
4-2. Working Example 2 (Example of Detection Process of Detector in Distance Measurement Unit)
5. Modification Example
6. Practical Application Example
7. Electronic Apparatus according to the Present Disclosure
7-1. Specific Example 1 (Example of Smartphone)
7-2. Specific Example 2 (Example of Digital Still Camera)
8. Configuration Adoptable by the Present Disclosure

General Description of Distance Measurement Device and Electronic Apparatus according to the Present Disclosure It is possible to configure a distance measurement device and an electronic apparatus according to the present disclosure to each include an average depth value or a depth histogram created from a distance image as a feature.

It is possible to configure the distance measurement device and the electronic apparatus according to the present disclosure each having the preferable configuration described above to each include exposure time as a parameter of an exposure control unit. In addition, it is possible to configure a control unit to perform control to increase the exposure time in a case of true depth.

In addition, it is possible to configure the distance measurement device and the electronic apparatus according to the present disclosure each having the preferable configuration described above to each include, in a case where a distance image calculator has a function of a confidence value filter that invalidates a pixel having a confidence value less than or equal to a predetermined threshold, a threshold of the confidence value filter as a parameter of the distance image calculator. In addition, it is possible to configure the control unit to perform control to decrease the threshold of the confidence value filter in a case of true depth.

In addition, it is possible in the distance measurement device and the electronic apparatus according to the present disclosure each having the preferable configuration described above to configure a detector to execute a process of determining whether a subject is a close and low-reflectance object from a feature of final depth. Specifically, it is possible to configure the detector to execute at least one of a process of determining that the number of valid pixels in a region of interest set in a screen is less than or equal to a predetermined threshold, a process of determining that the average depth of the valid pixels in the region of interest is less than or equal to a predetermined threshold, or a process of determining that the number of valid pixels in the whole of the screen is greater than or equal to a predetermined threshold.

Further, it is possible in the distance measurement device and the electronic apparatus according to the present disclosure each having the preferable configuration described above to configure the detector to create a histogram indicating the frequency of intermediate depth on one screen and execute a process of determining whether the subject is a close object from a feature of the intermediate depth. Specifically, it is possible to configure the detector to execute at least one of a process of determining that the mode of an intermediate depth histogram is less than or equal to a predetermined threshold (shorter distance than the threshold), a process of determining that the count value of the mode is within a predetermined range, or a process of determining that the cumulative count value less than or equal to distance defined as short distance is greater than or equal to a predetermined threshold.

Further, it is possible in the distance measurement device and the electronic apparatus according to the present disclosure each having the preferable configuration described above to configure the detector to execute a process of determining whether the subject is a low-reflectance object on the basis of the confidence value. Specifically, it is possible to configure the detector to execute a process of determining that the average value of the confidence values of the region of interest set in a screen is within a predetermined range.

ToF Distance Measurement System

FIG. 1 is a conceptual diagram of a ToF distance measurement system. A distance measurement device 1 according to this example adopts a ToF method as a measurement method of measuring the distance to a subject 10 that is a measurement target. The ToF method is a method of measuring the time elapsed before light radiated toward the subject 10 is reflected and returned by the subject 10. To achieve distance measurement in the ToF method, the distance measurement device 1 includes a light source 20 that emits light (e.g., laser light having a peak wavelength in an infrared wavelength region) to be irradiated toward the subject 10 and a light detection unit 30 that detects the reflection light reflected and returned by the subject 10.

Distance Measurement Device to which Technology according to the Present Disclosure Is Applied System Configuration FIG. 2 is a block diagram illustrating an example of a configuration of a ToF distance measurement device to which the technology according to the present disclosure is applied. The distance measurement device 1 (i.e., the distance measurement device 1 according to the present disclosure) according to this application example includes an AE (Automatic Exposure: automatic exposure) control unit 40 that performs exposure control on the basis of a signal value outputted by the light detection unit 30 and a distance measurement unit 50 in addition to the light source 20 and the light detection unit 30. The ToF distance measurement device 1 according to this application example is then able to detect distance information for each of the pixels of the light detection unit 30 and acquire a distance image (Depth Map: depth map) with high accuracy in units of imaging frames.

The distance measurement device 1 according to this application example is an indirect (Indirect) ToF distance measurement device (a so-called indirect ToF distance image sensor). The indirect ToF distance measurement device 1 detects a cycle in which pulse light having a predetermined cycle that is emitted from the light source 20 is reflected by a measurement target (subject) and the reflection light is received by the light detection unit 30. The distance to the measurement target is then measured by measuring the time of flight from the phase difference between the light emission cycle and the light reception cycle.

The light source 20 radiates light toward a measurement target by repeating on/off operations in predetermined cycles under the control of the AE control unit 40. For example, near-infrared light around 850 nm is used in many cases as irradiation light of the light source 20. The light detection unit 30 receives the light obtained in a case where the irradiation light from the light source 20 is reflected and returned by the measurement target and detects distance information for each of the pixels. The light detection unit 30 outputs the RAW image data of the current frame including the distance information detected for each of the pixels and light emission/exposure setting information. The RAW image data and the light emission/exposure setting information are supplied to the AE control unit 40 and the distance measurement unit 50.

The AE control unit 40 includes a next-frame light emission/exposure condition calculator 41 and a next-frame light emission/exposure controller 42. The next-frame light emission/exposure condition calculator 41 calculates the light emission/exposure conditions of the next frame on the basis of the RAW image data of the current frame and the light emission/exposure setting information supplied from the light detection unit 30. The light emission/exposure conditions of the next frame are the light emission time and the light emission intensity of the light source 20 and the exposure time of the light detection unit 30 for acquiring a distance image of the next frame. The next-frame light emission/exposure controller 42 controls the light emission time and the light emission intensity of the light source 20 and the exposure time of the light detection unit 30 for the next frame on the basis of the light emission/exposure conditions of the next frame calculated by the next-frame light emission/exposure condition calculator 41.

The distance measurement unit 50 includes a distance image calculator 51 that calculates a distance image. The distance image calculator 51 calculates a distance image by making a calculation with the RAW image data of the current frame including distance information detected for each of the pixels of the light detection unit 30 and makes an output to the outside of the distance measurement device 1 as distance image information including the respective pieces of information of depth that is deepness information of the subject and a confidence value that is light reception information of the light detection unit 30. Here, the distance image is an image in which a distance value (depth/value of deepness), for example, based on distance information detected for each of the pixels is reflected in the pixel.

Configuration Example of Light Detection Unit

Here, a specific configuration example of the light detection unit 30 is described with reference to FIG. 3. FIG. 3 is a block diagram illustrating an example of a configuration of the light detection unit 30.

The light detection unit 30 has a stacked structure including a sensor chip 31 and a circuit chip 32 stacked on the sensor chip 31. In this stacked structure, the sensor chip 31 and the circuit chip 32 are electrically coupled through a coupling section (not illustrated) such as a via (VIA) or a Cu—Cu junction. It is to be noted that FIG. 3 illustrates that a wiring line of the sensor chip 31 and a wiring line of the circuit chip 32 are electrically coupled through the coupling section described above.

A pixel array section 33 is formed on the sensor chip 31. The pixel array section 33 includes a plurality of pixels 34 disposed on the sensor chip 31 in a matrix (in an array) to form a two-dimensional grid pattern. In the pixel array section 33, each of the plurality of pixels 34 receives incident light (e.g., near-infrared light), performs photoelectric conversion, and outputs an analog pixel signal. The pixel array section 33 is provided with two vertical signal lines $VSL_1$ and $VSL_2$ for each of the pixel columns. In a case where M (M is an integer) represents the number of pixel columns of the pixel array section 33, the pixel array section 33 is provided with the (2×M) vertical signal lines VSL in total.

Each of the plurality of pixels 34 includes a first tap A and a second tap B (described in detail below). The vertical signal line $VSL_1$ of the two vertical signal lines $VSL_1$ and $VSL_2$ receives an analog pixel signal $AIN_{P1}$ based on the electric charge of the first tap A of each of the pixels 34 in the corresponding pixel column. In addition, the vertical signal line $VSL_2$ receives an analog pixel signal $AIN_{P1}$ based on the electric charge of the second tap B of each of the pixels 34 in the corresponding pixel column. The analog pixel signals $AIN_{P1}$ and $AIN_{P2}$ are described below.

A row selection section 35, a column signal processing section 36, an output circuit section 37, and a timing control section 38 are disposed on the circuit chip 32. The row selection section 35 drives the respective pixels 34 of the pixel array section 33 in units of pixel rows and causes the pixel signals $AIN_{P1}$ and $AIN_{P2}$ to be outputted. The analog pixel signals $AIN_{P1}$ and $AIN_{P2}$ outputted from the pixels 34 in the selected row that are driven by the row selection section 35 are supplied to the column signal processing section 36 through the two vertical signal lines $VSL_1$ and $VSL_2$.

The column signal processing section 36 includes, for example, a plurality of analog-digital converters (ADCs) 39 provided to the respective pixel columns in association with the pixel columns of the pixel array section 33. Each of the analog-digital converters 39 performs an analog-digital conversion process on the analog pixel signals $AIN_{P1}$ and $AIN_{P2}$ supplied through the vertical signal lines $VSL_1$ and $VSL_2$ and makes outputs to the circuit section 37. The output circuit section 37 executes a CDS (Correlated Double Sampling: correlated double sampling) process or the like on the digitized pixel signals $AIN_{P1}$ and $AIN_{P2}$ outputted from the column signal processing section 36 and makes outputs to the outside of the circuit chip 32.

The timing control section 38 generates a variety of timing signals, clock signals, control signals, and the like. The timing control section 38 controls the driving of the row selection section 35, the column signal processing section 36, the output circuit section 37, and the like on the basis of these signals.

Circuit Configuration Example of Pixel

FIG. 4 is a circuit diagram illustrating an example of a circuit configuration of the pixel 34 in the light detection unit 30.

The pixel 34 according to this example includes, for example, a photodiode 341 as a photoelectric converter. The pixel 34 includes an overflow transistor 342, two transfer transistors 343 and 344, two reset transistors 345 and 346, two floating diffusion layers 347 and 348, two amplification transistors 349 and 350, and two selection transistors 351 and 352 in addition to the photodiode 341. The two floating diffusion layers 347 and 348 correspond to the first and second taps A and B (that are sometimes referred to simply as "taps A and B" below) illustrated in FIG. 3 described above.

The photodiode 341 photoelectrically converts the received light to generate electric charge. It is possible to adopt, for example, a back-illuminated pixel structure for the photodiode 341 in which light radiated from the back side of the substrate is captured. The pixel structure is not, however, limited to a back-illuminated pixel structure, but it is also possible to adopt a front-illuminated pixel structure in which light radiated from the front side of the substrate is captured.

The overflow transistor 342 is coupled between the cathode electrode of the photodiode 341 and the power supply line of a power supply voltage $V_{DD}$ and has a function of resetting the photodiode 341. Specifically, the overflow transistor 342 enters a conduction state in response to an overflow gate signal OFG supplied from the row selection section 35. This causes the overflow transistor 342 to sequentially discharge the electric charge of the photodiode 341 to the power supply line of the power supply voltage $V_{DD}$.

The two transfer transistors 343 and 344 are respectively coupled between the cathode electrode of the photodiode 341 and the two floating diffusion layers 347 and 348 (taps A and B). Each of the transfer transistors 343 and 344 then enters a conduction state in response to a transfer signal TRG supplied from the row selection section 35. This causes the transfer transistors 343 and 344 to sequentially transfer the electric charge generated by the photodiode 341 to the floating diffusion layers 347 and 348, respectively.

The floating diffusion layers 347 and 348 corresponding to the first and second taps A and B accumulate the electric charge transferred from the photodiode 341, perform conversion to voltage signals each having the voltage value corresponding to the amount of electric charge, and generate the analog pixel signals $AIN_{P1}$ and $AIN_{P2}$.

The two reset transistors 345 and 346 are respectively coupled between the two floating diffusion layers 347 and 348 and the power supply line of the power supply voltage $V_{DD}$. Each of the reset transistors 345 and 346 then enters a conduction state in response to a reset signal RST supplied from the row selection section 35. This causes the reset transistors 345 and 346 to respectively pull out the electric charge from the floating diffusion layers 347 and 348 and initialize the amount of electric charge.

The two amplification transistors 349 and 350 are respectively coupled between the power supply line of the power supply voltage $V_{DD}$ and the two selection transistors 351 and 352. The amplification transistors 349 and 350 amplify voltage signals resulting from conversion from electric charge to voltages by the respective floating diffusion layers 347 and 348.

The two selection transistors 351 and 352 are respectively coupled between the two amplification transistors 349 and 350 and the vertical signal lines $VSL_1$ and $VSL_2$. Each of the selection transistors 351 and 352 then enters a conduction state in response to a selection signal SEL supplied from the row selection section 35. This causes the selection transistors 351 and 352 to output voltage signals amplified by the respective amplification transistors 349 and 350 to the two vertical signal lines $VSL_1$ and $VSL_2$ as the analog pixel signals $AIN_{P1}$ and $AIN_{P2}$.

The two vertical signal lines $VSL_1$ and $VSL_2$ are coupled to the input end of the one analog-digital converter 39 in the column signal processing section 36 for each of the pixel columns. The vertical signal lines $VSL_1$ and $VSL_2$ transmit the analog pixel signals $AIN_{P1}$ and $AIN_{P2}$ to the analog-digital converter 39. The analog pixel signals $AIN_{P1}$ and $AIN_{P2}$ are outputted from the pixels 34 for each of the pixel columns.

It is to be noted that the circuit configuration of each of the pixels 34 is not limited to the circuit configuration illustrated in FIG. 3 as long as the circuit configuration allows the analog pixel signals $AIN_{P1}$ and $AIN_{P2}$ to be generated by photoelectric conversion.

Here, the calculation of distance in the ToF method is described with reference to FIG. 5. FIG. 5 is a timing waveform chart for describing the calculation of distance by the ToF distance measurement device 1. The light source 20 and the light detection unit 30 in the ToF distance measurement device 1 each come into operation at a timing illustrated in the timing waveform chart of FIG. 5.

The light source 20 irradiates a measurement target with light for a predetermined period under the control of the AE control unit 40. The predetermined period is, for example, the period of the pulse light emission time $T_p$. The irradiation light emitted from the light source 20 is reflected and returned by the measurement target. This reflection light (active light) is received by the photodiode 341. The time from the start of the irradiation of the measurement target with the irradiation light to the reception of the reflection light by the photodiode 341, that is, the time of flight, is the time corresponding to the distance from the distance measurement device 1 to the measurement target.

In FIG. 4, the photodiode 341 receives reflection light from a measurement target for the pulse light emission time $T_p$ from the time point to start to radiate irradiation light. In this case, the light received by the photodiode 341 also includes ambient light (ambient light) reflected/scattered by an object, the atmosphere, and the like in addition to the reflection light (active light) obtained in a case where the light radiated to the measurement target is reflected and returned by the measurement target.

In a case where light is received one time, the electric charge resulting from photoelectric conversion by the photodiode 341 is transferred to the tap A (floating diffusion layer 347) and accumulated. A signal no having the voltage value corresponding to the amount of electric charge accumulated in the floating diffusion layer 347 is then acquired from the tap A. At a time point when the accumulation timing of the tap A is finished, the electric charge resulting from photoelectric conversion by the photodiode 341 is transferred to the tap B (floating diffusion layer 348) and accumulated. A signal $n_1$ having the voltage value corresponding to the amount of electric charge accumulated in the floating diffusion layer 348 is then acquired from the tap B.

In this way, the tap A and the tap B are driven by shifting the phases of the accumulation timings by 180 degrees (driven by completely inverting the phases), thereby acquiring the signal no and the signal $n_1$, respectively. Such driving is then repeated a plurality of times and the signals no and the signals $n_1$ are accumulated and integrated, thereby acquiring an accumulated signal $N_0$ and an accumulated signal $N_1$, respectively.

For example, the one pixel 34 receives light two times within one phase. Signals are accumulated in the tap A and the tap B four times: 0 degrees; 90 degrees; 180 degrees; and 270 degrees. Distance D from the distance measurement device 1 to the measurement target is calculated on the basis of the accumulated signal No and the accumulated signal $N_1$ acquired in this way.

Each of the accumulated signal $N_0$ and the accumulated signal $N_1$ also includes the component of ambient light (ambient light) reflected/scattered by an object, the atmosphere, and the like in addition to the component of reflection light (active light) reflected and returned by a measurement target. Thus, to exclude the influence of this component of ambient light (ambient light) and keep the component of the reflection light (active light), signals $n_2$ based on the ambient light are also accumulated and integrated and an accumulated signal $N_2$ for the ambient light component is acquired in the operation described above.

The use of the accumulated signal $N_0$ and the accumulated signal $N_1$ each including an ambient light component and the accumulated signal $N_2$ for the ambient light component acquired in this way allows the arithmetic processing based on the following equation (1) and equation (2) to calculate the distance D from the distance measurement device 1 to a measurement target.

[Math. 1]
$$\Delta\phi = \frac{N_0 - N_2}{N_0 + N_1 - 2 \cdot N_2} \quad (1)$$

[Math. 2]
$$D = \frac{c \cdot T_p}{2}\left(1 - \frac{\Delta\phi}{2\pi}\right) \quad (2)$$

In the equation (1) and the equation (2), D represents the distance from the distance measurement device 1 to a measurement target, c represents the speed of light, and $T_p$ represents pulse light emission time.

The distance image calculator 51 illustrated in FIG. 2 calculates the distance D, which is outputted from the light detection unit 30, from the distance measurement device 1 to a measurement target through the arithmetic processing based on the equation (1) and the equation (2) described above by using the accumulated signal $N_0$ and the accumulated signal $N_1$ each including an ambient light component and the accumulated signal $N_2$ for the ambient light component and makes an output as distance image information. For example, it is possible to exemplify image information colored with a color having the density corresponding to the distance D as the distance image information. It is to be noted that the calculated distance D is outputted here as distance image information, but the calculated distance D may also be outputted as distance information with no process.

Configuration Example of Distance Image Calculator

FIG. 6 illustrates an example of a configuration of the distance image calculator 51 of the distance measurement unit 50 in the distance measurement device 1. The distance image calculator 51 according to this example includes a depth calculation section 511, a calibration section 512, a noise reduction section 513, and an artifact removal section 514.

In the distance image calculator 51 having the configuration described above, the depth calculation section 511 calculates, by using RAW image data provided from the light detection unit 30, depth information and confidence value information from the phase difference obtained in a case where light emitted from the light source 20 is reflected by a subject and the reflection light arrives at the light detection unit 30. Here, the "depth" is deepness information (distance information) of the subject. The "confidence value" is light reception information of the light detection unit 30 and the amount (degree) of reflection light obtained in a case where the light emitted from the light source 20 is reflected and returned to the light detection unit 30 by the subject.

For example, the calibration section 512 phases light emitted from the light source 20 and light entering the light detection unit 30 with each other and performs a calibration process such as waveform correction and temperature correction. The noise reduction section 513 includes, for example, a low-pass filter and performs a process of reducing noise. The artifact removal section 514 has functions of a variety of filters including a confidence value filter described below. The artifact removal section 514 performs a process of rejecting information resulting from incorrect distance measurement and information having a low confidence value for the light reception of the light detection unit 30 from the respective pieces of information of depth and confidence values that have passed through the noise reduction section 513.

It is to be noted that the configuration is exemplified here in which the calibration section 512, the noise reduction section 513, and the artifact removal section 514 are disposed in this order, but the calibration section 512, the noise reduction section 513, and the artifact removal section 514 may be disposed in any order. In other words, the order may be changed.

Autofocus System

The indirect ToF distance measurement device 1 having the configuration described above is applicable, for example, to autofocus that automatically adjusts the focus of the camera. FIG. 7 illustrates an overview of a configuration of an autofocus system.

The distance image calculator 51 calculates a distance image by making a calculation with the RAW image data of the current frame including distance information detected for each of the pixels of the light detection unit 30 and outputs depth information that is deepness information of the subject. This depth information is used for control for automatically adjusting the focus of an RGB camera 61.

Specifically, the depth information calculated by the distance image calculator 51 is supplied to a contrast AF (autofocus) unit 63 through an initial value determination unit 62. The contrast AF unit 63 sets the initial value provided from the initial value determination unit 62 as a reference for autofocus on the basis of the depth information provided from the distance image calculator 51. The contrast AF unit 63 then uses the reference (initial value) as a center and performs control to search for a portion having great contrast (brightness difference) and bring the portion into focus on the basis of image information appearing on an imaging element of the RGB camera 61 while causing a lens drive unit 64 to move a lens of the RGB camera 61 in the optical axis direction.

Regarding Low-Reflectance and Close Object

Incidentally, in a case where an image of a low-reflectance object such as a black desktop computer is obliquely shot in autofocus application, a smaller amount of light is reflected and returned by the object than the amount of light reflected and returned in a case where an image of the object is shot from the front, causing defocus. Especially, in a case of defocus at a short distance, a user who shoots an image feels quite strange.

AE control that adjusts the exposure time from the amount of light reflected and returned by an object is a countermeasure, but has the following two problems.

It is not possible to determine whether or not the amount of light is small because a subject is a distant object and control is thus performed to increase the exposure time for a distant subject located beyond the target distance of the application, increasing the power consumption.

The maximum measurable distance is determined in accordance with the light emission frequency (light emission cycle) of laser light emitted from the light source 20, but increasing the exposure time of a subject located at a distance beyond the maximum distance causes aliasing distortion (folded distance) referred to as aliasing and adjusts the focus at an incorrect distance.

Embodiment of the Present Disclosure

It is not possible to adopt the AE control that adjusts the exposure time from the amount of light reflected and returned by an object because of the two problems described above. In the embodiment of the present disclosure, control is thus performed that adaptively changes a parameter of the AE control by detecting a close and low-reflectance object. This makes possible to measure the distance of a subject (object) for which distance measurement results in failure in a case where the control is not performed and makes it possible to maintain the conventional performance in other scenes.

The following describes specific working examples of the embodiment of the present disclosure.

Working Example 1

A working example 1 is a configuration example of the distance measurement unit 50 including the distance image calculator 51. FIG. 8 is a block diagram illustrating an example of a configuration of the distance measurement unit 50 according to the working example 1.

The distance measurement unit 50 according to the working example 1 includes a detector 52 and a dynamic controller 53 in addition to the distance image calculator 51 that calculates depth information on the basis of RAW image data outputted from the light detection unit 30.

The detector 52 detects a close and low-reflectance object (object for which distance measurement results in failure) whose distance is unmeasurable from the features of data (such as intermediate depth, final depth, and a confidence value) processed by the distance image calculator 51. Here, the "features" include an average depth value, a histogram created from a distance image (depth image), or the like. For the histogram created from a depth image, as an example, 100 mm is set as the width between bins that are equidistant segments. The histogram is created by setting the number of bins=int(aliasing distance/width between bins)+1. int is a function for conversion to an integer.

The dynamic controller 53 dynamically controls at least one of a parameter of the AE control unit 40 or a parameter of the distance image calculator 51, that is, any one or both of the parameter of the AE control unit 40 and the parameter of the distance image calculator 51 on the basis of a result of detection by the detector 52. For example, it is possible to exemplify exposure time as a parameter of the AE control unit 40. For the control of the parameter of the AE control unit 40, control is performed to increase the exposure time in a case of the depth (distance) of an object for which distance measurement results in success, that is, the true depth.

For example, it is possible to exemplify a threshold of a confidence value filter of the artifact removal section 514 (see FIG. 6) in the distance image calculator 51 as a parameter of the distance image calculator 51. For the control of the parameter of the distance image calculator 51, control is performed to decrease the threshold of the confidence value filter of the artifact removal section 514 in a case of the true depth. The confidence value filter of the artifact removal section 514 has a function of invalidating a pixel (pixel) having a confidence value less than or equal to a predetermined threshold.

Working Example 2

A working example 2 is an example of a detection process of the detector 52 in the distance measurement unit 50, that is, an example of a process executed by the detector 52. The working example 2 is a processing example of a method of controlling the distance measurement device according to the present disclosure. FIG. 9 is a flowchart illustrating an example of a detection process executed by the detector 52 according to the working example 2.

The following assumes that, in a case where a processor is configured to achieve a function of the distance measurement unit 50, a detection process of the detector 52, that is, a series of processes for detecting a low-reflectance and close object whose distance is unmeasurable, is executed under the control of the processor included in the distance measurement unit 50.

The processor (that is referred to simply as "processor" below) included in the distance measurement unit 50 first performs a process of determining whether a subject is a close and low-reflectance object from the feature of final depth that is data processed by the distance image calculator 51 (step S11).

In step S11, the processes based on the determination formulas of (1) to (3) below are performed and the logical conjunction is obtained of all of the determination formulas of (1) to (3). This makes it possible to determine that the subject is a close object whose distance is unmeasurable.

(1) Determine that the number ROI_valid_pixel_number of valid pixels in ROI (Region Of Interest: region of interest) set in a screen is less than or equal to a predetermined threshold defined_number_threshold_1.

$$\text{ROI\_valid\_pixel\_number} < \text{defined\_number\_threshold\_1}$$

The process based on this determination formula (1) makes it possible to determine that a subject is an object whose distance is unmeasurable (an object for which distance measurement results in failure).

(2) Determine that the average depth ROI_valid_average_depth of the valid pixels in ROI set in a screen is less than or equal to a predetermined threshold defined_depth_threshold.

$$\text{ROI\_valid\_average\_depth} < \text{defined\_depth\_threshold}$$

The process based on this determination formula (2) makes it possible to determine that a subject is a close object.

(3) Determine that the number all_valid_pixel_number of valid pixels in the whole of a screen is greater than or equal to a predetermined threshold defined_number_threshold_2.

$$\text{defined\_number\_threshold\_2} \leq \text{all\_valid\_pixel\_number}$$

The process based on this determination formula (3) makes it possible to determine that a subject is a close object because at least several valid pixels are to be present at a short distance. The process based on the determination formula (3) is effective especially in a case where an image of a low-reflectance object a is obliquely shot at a short distance.

In a case where all of the determination formulas of (1) to (3) described above are satisfied and it is determined that the subject is a close object whose distance is unmeasurable (YES in S11), the processor performs a process of determining whether the subject is a close object from the feature of intermediate depth (step S12).

In step S12, a histogram indicating the frequency of intermediate depth on one screen is created, the processes based on the determination formulas of (4) to (6) below are performed, and the logical conjunction are obtained of all of the determination formulas of (4) to (6), thereby making it possible to determine that the subject is a close object. In a case where an image of one scene is shot, the intermediate depth histogram has a peak on a portion of the screen having the highest frequency of the intermediate depth.

(4) Determine that the mode depth_most_frequent_bin_numer of the intermediate depth histogram is less than or equal to a predetermined threshold defined_bin_threshold (shorter distance than the threshold).

$$\text{depth\_most\_frequent\_bin\_numer} \leq \text{defined\_bin\_threshold}$$

The process based on this determination formula (4) makes it possible to determine that a subject is a close object.

(5) Determine that a count value depth_most_frequent_count_value of the mode of the intermediate depth histogram is within the range of an upper limit threshold defined_count_threshold_U and a lower limit defined_count_threshold_L.

$$\text{defined\_count\_threshold\_L} \leq \text{depth\_most\_frequent\_count\_value} \leq \text{defined\_count\_threshold\_U}$$

The process based on this determination formula (5) makes it possible to determine that a subject is a close object.

(6) Determine that a cumulative count value near_distance_pixel_number less than or equal to distance defined as short distance is greater than or equal to a predetermined threshold defined_pixel_threshold.

The process based on this determination formula (6) makes it possible to determine that a subject is a close object.

In a case where all of the determination formulas of (4) to (6) described above are satisfied and it is determined that the subject is a close object (YES in S12), the processor performs a process of determining whether the subject is a low-reflectance object on the basis of a confidence value indicating the degree to which laser light is returned to the light detection unit 30 (step S13).

In step S13, it is determined that the average value ROI_confidence_average of confidence values in ROI set in the screen is within the range of an upper limit threshold defined_confidence_threshold_U and a lower limit threshold defined_confidence_threshold_L.

$$\text{defined\_confidence\_threshold\_L} \leq \text{ROI\_confidence\_average} \leq \text{defined\_confidence\_threshold\_U}$$

The process based on the determination formula described above makes it possible to determine that a subject is a low-reflectance object.

In a case where the processor determines in step S11 that the subject is a close object whose distance is unmeasurable (YES in S11), determines in step S12 that the subject is a close object (YES in S12), and determines in step S13 that the subject is a low-reflectance object (YES in S13), the processor sets true (short distance, low reflectance, and unmeasurable distance) as the next status (step S14).

In a case where the processor determines in step S11 that the subject is not a close object whose distance is unmeasurable (NO in S11), in a case where the processor determines in step S12 that the subject is not a close object (NO in S12), or in a case where the processor determines in step S13 that the subject is not a low-reflectance object (NO in S13), the processor sets false (neither short distance nor low reflectance) as the next status (step S15).

The series of processes described above allow the detector 52 in the distance measurement unit 50 to detect a close and low-reflectance object whose distance is unmeasurable as the subject and supply a result of the detection to the dynamic controller 53. The dynamic controller 53 then dynamically controls any one or both of a parameter of the AE control unit 40 and a parameter of the distance image calculator 51 on the basis of the result of the detection of the detector 52.

It is to be noted that all of the determination formulas of (1) to (3) are used in the determination process in step S11 in the series of processes described above, but all of the determination formulas do not necessarily have to be used. It is sufficient if one or more of the determination formulas of (1) to (3) are used. Similarly, all of the determination formulas of (4) to (6) do not also have to be used in the determination process in step S12. It is sufficient if one or more of the determination formulas of (4) to (6) are used. In addition, in the process of the determination formula of (1) in step S11, the determination indicating that the distance is unmeasurable is excluded from the determination formula because, in a case where the current status is true, the countermeasure causes the distance to be measurable.

Modification Example

Although the technology according to the present disclosure has been described above on the basis of the preferred embodiments, the technology according to the present disclosure is not limited to the embodiments. The configuration and the structure of the distance measurement device described in each of the embodiments described above are examples and may be modified as appropriate.

For example, in the embodiment described above, depth is used for the determination process of the detector 52 in the distance measurement unit 50. Especially a low-reflectance object such as a dark object, however, has more noise. The depth noise standard deviation (noise sigma) may be thus used. In addition, in the embodiment described above, a depth histogram is used for the determination process of the detector 52 in the distance measurement unit 50. A confidence value histogram may be, however, used.

In addition, in the embodiment described above, in the determination process of the detector 52 in the distance measurement unit 50, the same determination formula is applied to the determination of true and the determination of false, but different determination formulas may be used for the determination of true and the determination of false. Further, to secure the stability of the determination process, control may be applied to change the status only in a case of consecutive determinations of false/true.

Practical Application Example

In the embodiment described above, description is given by using, as an example, a case where the distance measurement device according to the present disclosure is applied to autofocus, but the application to autofocus is not limitative. In other words, it is also possible to use the distance measurement device according to the present disclosure as a distance measurement device that is mounted on any type of a mobile body such as an automobile, an electric vehicle, a hybrid electric vehicle, a motorcycle, a bicycle, a personal mobility, an airplane, a drone, a vessel, a robot, a construction machine, and an agricultural machine (tractor).

Electronic Apparatus according to the Present Disclosure

The distance measurement device according to the present disclosure described above is usable as a distance measurement device mounted on each of a variety of electronic apparatuses. For example, it is possible to exemplify a mobile apparatus such as a smartphone, a digital camera, and a tablet as the electronic apparatus mounted with the distance measurement device. The mobile apparatus is not, however, limitative.

The following exemplifies a smartphone and a digital still camera as specific examples of the electronic apparatus in which the distance measurement device according to the present disclosure is used. Distance image information (depth information) of the distance measurement device mounted on any of a smartphone and a digital still camera is used as lens driving information for autofocus. The specific examples mentioned here are, however, merely examples. These specific examples are not limitative.

Specific Example 1: Example of Smartphone

FIG. 10A is an external view of a smartphone according to a specific example 1 of the electronic apparatus according to the present disclosure from the front side and FIG. 10B is an external view from the back side. The smartphone 100 according to this specific example includes a display unit 120 on the front side of a housing 110. In addition, the smartphone 100 includes, for example, an imaging unit 130 at the upper portion of the housing 110 on the back side.

The distance measurement device 1 according to the embodiment of the present disclosure described above is usable, for example, on the smartphone 100 that is an example of the mobile apparatus having the configuration described above. In this case, it is possible to dispose the light source 20 and the light detection unit 30 of the distance measurement device 1 near the imaging unit 130, for example, as illustrated in FIG. 10B. The disposition example of the light source 20 and the light detection unit 30 illustrated in FIG. 10B is, however, an example. This disposition example is not limitative.

As described above, the smartphone 100 according to the specific example 1 is manufactured by mounting the distance measurement device 1 according to the embodiment of the present disclosure. The smartphone 100 according to the specific example 1 is then mounted with the distance measurement device 1 described above and is thus able to perform AE control to bring even a close and low-reflectance object into focus. Especially even in a case where an image of a close and low-reflectance object is obliquely shot, it is thus possible to obtain a captured image in focus.

Specific Example 2: Example of Digital Still Camera

It is an external view of a lens interchangeable single lens reflex type digital still camera according to a specific example 2 of the electronic apparatus according to the present disclosure from the front side and FIG. 11B is an external view from the back side.

A lens interchangeable single lens reflex type digital still camera 200 includes, for example, an interchangeable taking lens unit (interchangeable lens) 212 on the right front side of a camera main body section (camera body) 211 and a grip section 213 for a photographer to grip on the left front side. Further, there is provided a monitor 214 substantially in the middle of the back of the camera main body section 211. There is provided a viewfinder (eyepiece window) 215 above the monitor 214. Looking into the viewfinder 215 allows the photographer to visually recognize a light image of a subject guided by the taking lens unit 212 and determine the compositions.

The distance measurement device 1 according to the embodiment of the present disclosure described above is usable, for example, on the digital still camera 200 that is an example of the mobile apparatus having the configuration described above. In this case, it is possible to dispose the light source 20 and the light detection unit 30 of the distance measurement device 1 near the taking lens unit 212, for example, as illustrated in FIG. 11A. The disposition example of the light source 20 and the light detection unit 30 illustrated in FIG. 11A is, however, an example. This disposition example is not limitative.

As described above, the digital still camera 200 according to the specific example 2 is manufactured by mounting the distance measurement device 1 according to the embodiment of the present disclosure. The digital still camera 200 according to the specific example 2 is then mounted with the distance measurement device 1 described above and is thus able to perform AE control to bring even a close and low-reflectance object into focus. Especially even in a case where an image of a close and low-reflectance object is obliquely shot, it is thus possible to obtain a captured image in focus.

Configuration Adoptable by the Present Disclosure

It is to be noted that the present disclosure may also have the following configurations.

A. Distance Measurement Device

[A-1] A distance measurement device including:
  a light detection unit that receives light from a subject;
  an exposure control unit that performs exposure control on the basis of a signal value outputted by the light detection unit;
  a distance image calculator that calculates a distance image on the basis of an output of the light detection unit, the distance image including depth and a confidence value, the depth including deepness information of the subject, the confidence value including light reception information of the light detection unit;
  a detector that detects, from a feature of data processed by the distance image calculator, a close and low-reflectance object whose distance is unmeasurable; and
  a control unit that dynamically controls at least one of a parameter of the exposure control unit or a parameter of the distance image calculator on the basis of a result of detection of the detector.

[A-2] The distance measurement device according to [A-1], in which the feature includes an average depth value or a depth histogram created from the distance image.

[A-3] The distance measurement device according to [A-1] or [A-2], in which the parameter of the exposure control unit includes exposure time.

[A-4] The distance measurement device according to [A-3], in which the control unit performs control to increase the exposure time in a case of true depth.

[A-5] The distance measurement device according to [A-1] or [A-2], in which
  the distance image calculator has a function of a confidence value filter that invalidates a pixel having a confidence value less than or equal to a predetermined threshold, and
  the parameter of the distance image calculator includes a threshold of the confidence value filter.

[A-6] The distance measurement device according to [A-5], in which the control unit performs control to decrease the threshold of the confidence value filter in a case of true depth.

[A-7] The distance measurement device according to any of [A-1] to [A-6], in which the detector executes a process of determining whether the subject is a close and low-reflectance object from a feature of final depth.

[A-8] The distance measurement device according to [A-7], in which the detector executes at least one of a process of determining that a number of valid pixels in a region of interest set in a screen is less than or equal to a predetermined threshold, a process of determining that average depth of the valid pixels in the region of interest is less than or equal to a predetermined threshold, or a process of determining that a number of valid pixels in a whole of the screen is greater than or equal to a predetermined threshold.

[A-9] The distance measurement device according to [A-7] or [A-8], in which the detector creates a histogram indicating frequency of intermediate depth on one screen and executes a process of determining whether the subject is a close object from a feature of the intermediate depth.

[A-10] The distance measurement device according to [A-9], in which the detector executes at least one of a process of determining that a mode of an intermediate depth histogram is less than or equal to a predetermined threshold (shorter distance than the threshold), a process of determining that a count value of the mode is within a predetermined range, or a process of determining that a cumulative count value less than or equal to distance defined as short distance is greater than or equal to a predetermined threshold.

[A-11] The distance measurement device according to [A-9] or [A-10], in which the detector executes a process of determining whether the subject is a low-reflectance object on the basis of the confidence value.

[A-12] The distance measurement device according to [A-11], in which the detector executes a process of determining that an average value of confidence values of a region of interest set in a screen is within a predetermined range.

B. Electronic Apparatus

[B-1] An electronic apparatus including
  a distance measurement device including
    a light detection unit that receives light from a subject,
    an exposure control unit that performs exposure control on the basis of a signal value outputted by the light detection unit,
    a distance image calculator that calculates a distance image on the basis of an output of the light detection unit, the distance image including depth and a confidence value, the depth including deepness information of the subject, the confidence value including light reception information of the light detection unit,
    a detector that detects, from a feature of data processed by the distance image calculator, a close and low-reflectance object whose distance is unmeasurable, and
    a control unit that dynamically controls at least one of a parameter of the exposure control unit or a parameter of the distance image calculator on the basis of a result of detection of the detector.

[B-2] The electronic apparatus according to [B-1], in which the feature includes an average depth value or a depth histogram created from the distance image.

[B-3] The electronic apparatus according to [B-1] or [B-2], in which the parameter of the exposure control unit includes exposure time.

[B-4] The electronic apparatus according to [B-3], in which the control unit performs control to increase the exposure time in a case of true depth.

[B-5] The electronic apparatus according to [B-1] or [B-2], in which
  the distance image calculator has a function of a confidence value filter that invalidates a pixel having a confidence value less than or equal to a predetermined threshold, and the parameter of the distance image calculator includes a threshold of the confidence value filter.

[B-6] The electronic apparatus according to [B-5], in which the control unit performs control to decrease the threshold of the confidence value filter in a case of true depth.

[B-7] The electronic apparatus according to any of [B-1] to [B-6], in which the detector executes a process of determining whether the subject is a close and low-reflectance object from a feature of final depth.

[B-8] The electronic apparatus according to [B-7], in which the detector executes at least one of a process of determining that a number of valid pixels in a region of interest set in a screen is less than or equal to a predetermined threshold, a process of determining that average depth of the valid pixels in the region of interest is less than or equal to a predetermined threshold, or a process of determining that a number of valid pixels in a whole of the screen is greater than or equal to a predetermined threshold.

[B-9] The electronic apparatus according to [B-7] or [B-8], in which the detector creates a histogram indicating frequency of intermediate depth on one screen and executes a process of determining whether the subject is a close object from a feature of the intermediate depth.

[B-10] The electronic apparatus according to [B-9], in which the detector executes at least one of a process of determining that a mode of an intermediate depth histogram is less than or equal to a predetermined threshold (shorter distance than the threshold), a process of determining that a count value of the mode is within a predetermined range, or a process of determining that a cumulative count value less than or equal to distance defined as short distance is greater than or equal to a predetermined threshold.

[B-11] The electronic apparatus according to [B-9] or [B-10], in which the detector executes a process of determining whether the subject is a low-reflectance object on the basis of the confidence value.

[B-12] The electronic apparatus according to [B-11], in which the detector executes a process of determining that an average value of confidence values of a region of interest set in a screen is within a predetermined range.

REFERENCE SIGNS LIST

1 . . . distance measurement device, 10 . . . subject (measurement target), 20 . . . light source, 30 . . . light detection unit, 40 . . . AE control unit, 41 . . . next-frame light emission/exposure condition calculator, 42 . . . next-frame light emission/exposure controller, 50 . . . distance measurement unit, 51 . . . distance image calculator, 52 . . . detector, 53 . . . dynamic controller, 61 . . . RGB camera, 63 . . . contrast AF unit

The invention claimed is:

1. A distance measurement device, comprising:
a light detection circuit configured to receive light from a subject;
an exposure control circuit configured to perform exposure control based on a signal value outputted by the light detection circuit;
a distance image calculator configured to calculate a distance image based on an output of the light detection circuit, wherein
the distance image includes depth and a confidence value,
the depth includes deepness information of the subject, and
the confidence value includes light reception information of the light detection circuit;
a detector configured to detect, from a feature of data processed by the distance image calculator, a close and low-reflectance object whose distance is unmeasurable; and
a control circuit configured to dynamically control a parameter of the distance image calculator based on a result of the detection of the detector.

2. The distance measurement device according to claim 1, wherein the feature includes one of an average depth value or a depth histogram created from the distance image.

3. The distance measurement device according to claim 1, wherein
the control circuit is further configured to control a parameter of the exposure control circuit, and
the parameter of the exposure control circuit includes exposure time.

4. The distance measurement device according to claim 3, wherein the control circuit is further configured to increase the exposure time in a case of true depth.

5. The distance measurement device according to claim 1, wherein
the distance image calculator has a function of a confidence value filter that invalidates a pixel having a confidence value less than or equal to a determined threshold, and
the parameter of the distance image calculator includes a threshold of the confidence value filter.

6. The distance measurement device according to claim 5, wherein the control circuit is further configured to decrease the threshold of the confidence value filter in a case of true depth.

7. The distance measurement device according to claim 1, wherein the detector is further configured to determine whether the subject is the close and low-reflectance object from the feature of final depth.

8. The distance measurement device according to claim 7, wherein the detector is further configured to execute at least one of:
a first process to determine that a number of valid pixels in a region of interest set in a screen is less than or equal to a first determined threshold,
a second process to determine that average depth of the valid pixels in the region of interest is less than or equal to a second determined threshold, or
a third process to determine that a number of valid pixels in a whole of the screen is greater than or equal to a third determined threshold.

9. The distance measurement device according to claim 7, wherein the detector is further configured to:
create a histogram indicating frequency of intermediate depth on one screen; and
determining determine whether the subject is a close object from the feature of the intermediate depth.

10. The distance measurement device according to claim 9, wherein the detector is further configured to execute at least one of:
a first process to determine that a mode of an intermediate depth histogram is less than or equal to a first determined threshold,
a second process to determine that a count value of the mode is within a determined range, or
a third process to determine that a cumulative count value less than or equal to a specific distance is greater than or equal to a second determined threshold.

11. The distance measurement device according to claim 9, wherein the detector is further configured to determine whether the subject is a low-reflectance object based on the confidence value.

12. The distance measurement device according to claim 11, wherein the detector is further configured to that an average value of confidence values of a region of interest set in a screen is within a determined range.

13. A method of controlling a distance measurement device, the distance measurement device including a light detection circuit that receives light from a subject, an exposure control circuit that performs exposure control based on a signal value outputted by the light detection circuit, a distance image calculator that calculates a distance image based on an output of the light detection circuit, the distance image including depth and a confidence value, the depth including deepness information of the subject, the confidence value including light reception information of the light detection circuit, and a detector that detects, from a feature of data processed by the distance image calculator, a close and low-reflectance object whose distance is unmeasurable, the method comprising:
  dynamically controlling a parameter of the distance image calculator based on a result of the detection of the detector.

14. An electronic apparatus, comprising:
a distance measurement device that includes:
  a light detection circuit configured to receive light from a subject;
  an exposure control circuit configured to perform exposure control based on a signal value outputted by the light detection circuit;
  a distance image calculator configured to calculate a distance image based on an output of the light detection circuit, wherein
  the distance image includes depth and a confidence value,
  the depth includes deepness information of the subject, and
  the confidence value includes light reception information of the light detection circuit;
a detector configured to detect, from a feature of data processed by the distance image calculator, a close and low-reflectance object whose distance is unmeasurable; and
a control circuit configured to dynamically control a parameter of the distance image calculator on a basis of a result of the detection of the detector.

* * * * *